United States Patent
Kaiser

(10) Patent No.: US 12,196,457 B2
(45) Date of Patent: Jan. 14, 2025

(54) THERMAL CELL PANEL SYSTEM FOR HEATING AND COOLING AND ASSOCIATED METHODS

(71) Applicant: Commercial Energy Saving Plus, LLC, Boca Raton, FL (US)

(72) Inventor: Stewart Kaiser, Palm Beach Gardens, FL (US)

(73) Assignee: COMMERCIAL ENERGY SAVING PLUS, LLC, Boca Raton, FL (US)

( * ) Notice: Subject to any disclaimer, the term of this patent is extended or adjusted under 35 U.S.C. 154(b) by 486 days.

(21) Appl. No.: 17/498,327

(22) Filed: Oct. 11, 2021

(65) Prior Publication Data
US 2022/0026120 A1   Jan. 27, 2022

Related U.S. Application Data

(62) Division of application No. 16/423,887, filed on May 28, 2019, now Pat. No. 11,143,437.

(51) Int. Cl.
*F24S 90/00*       (2018.01)
*F24S 10/70*       (2018.01)
(Continued)

(52) U.S. Cl.
CPC ............... *F24S 90/00* (2018.05); *F24S 10/70* (2018.05); *F24S 50/00* (2018.05); *F24S 70/20* (2018.05);
(Continued)

(58) Field of Classification Search
CPC .. F24S 90/00; F24S 10/70; F24S 80/30; F24S 70/20; F24S 50/00; F24S 80/50; F24B 29/003; F24B 49/022
(Continued)

(56) References Cited

U.S. PATENT DOCUMENTS 4,303,059 A * 12/1981 Ford .................. F24S 23/80
126/657
7,451,611 B2  11/2008 Muscatell
(Continued)

FOREIGN PATENT DOCUMENTS

CN   201607039 U   10/2010
JP   200485062     3/2004
(Continued)

OTHER PUBLICATIONS

US International Searching Authority, PCT International Search Report and Written Opinion dated Aug. 7, 2020; entire document.

*Primary Examiner* — Vivek K Shirsat
(74) *Attorney, Agent, or Firm* — ALLEN DYER ET AL.

(57) ABSTRACT

A thermal cell panel system for heating and cooling using a refrigerant includes a plurality of solar thermal cell chambers, and a piping network for a flow of the refrigerant through the plurality of solar thermal cell chambers. In addition, the system includes a compressor having a motor coupled to a variable frequency drive ("VFD"), where the compressor is coupled to the piping network upstream of the plurality of solar thermal cell chambers and the VFD is configured to adjust a speed of the motor in response to the pressure of the refrigerant within the plurality of solar thermal cell chambers. The piping network includes an inlet manifold coupled to the inlet of each solar thermal cell chamber, and an outlet manifold coupled to the outlet of each solar cell chamber.

6 Claims, 8 Drawing Sheets

(51) Int. Cl.
*F24S 50/00* (2018.01)
*F24S 70/20* (2018.01)
*F24S 80/30* (2018.01)
*F24S 80/50* (2018.01)
*F25B 29/00* (2006.01)
*F25B 49/02* (2006.01)

(52) U.S. Cl.
CPC ............... *F24S 80/30* (2018.05); *F24S 80/50* (2018.05); *F25B 29/003* (2013.01); *F25B 49/022* (2013.01); *F25B 2700/19* (2013.01)

(58) Field of Classification Search
USPC .................................. 126/584, 594, 651–662

See application file for complete search history.

(56) References Cited

U.S. PATENT DOCUMENTS

| | | |
|---|---|---|
| 7,905,110 B2 | 3/2011 | Reich et al. |
| 8,347,877 B2 | 1/2013 | Shabtay et al. |
| 9,541,307 B2 * | 1/2017 | Jackman ................. H02S 40/44 |
| 10,900,694 B2 | 1/2021 | Kaiser |
| 2008/0257039 A1 | 10/2008 | Thiel et al. |
| 2012/0117986 A1 | 5/2012 | Hammond |
| 2012/0204587 A1 * | 8/2012 | Zamir ................... F25B 27/005 |
| | | 62/235.1 |
| 2015/0267946 A1 | 9/2015 | Lowstuter, Jr. et al. |
| 2018/0135899 A1 | 5/2018 | Turner |
| 2019/0219315 A1 | 7/2019 | Michael et al. |
| 2020/0355404 A1 | 11/2020 | Carroll |

FOREIGN PATENT DOCUMENTS

| | | |
|---|---|---|
| WO | 2017211351 | 12/2017 |
| WO | 2018169485 | 9/2018 |

* cited by examiner

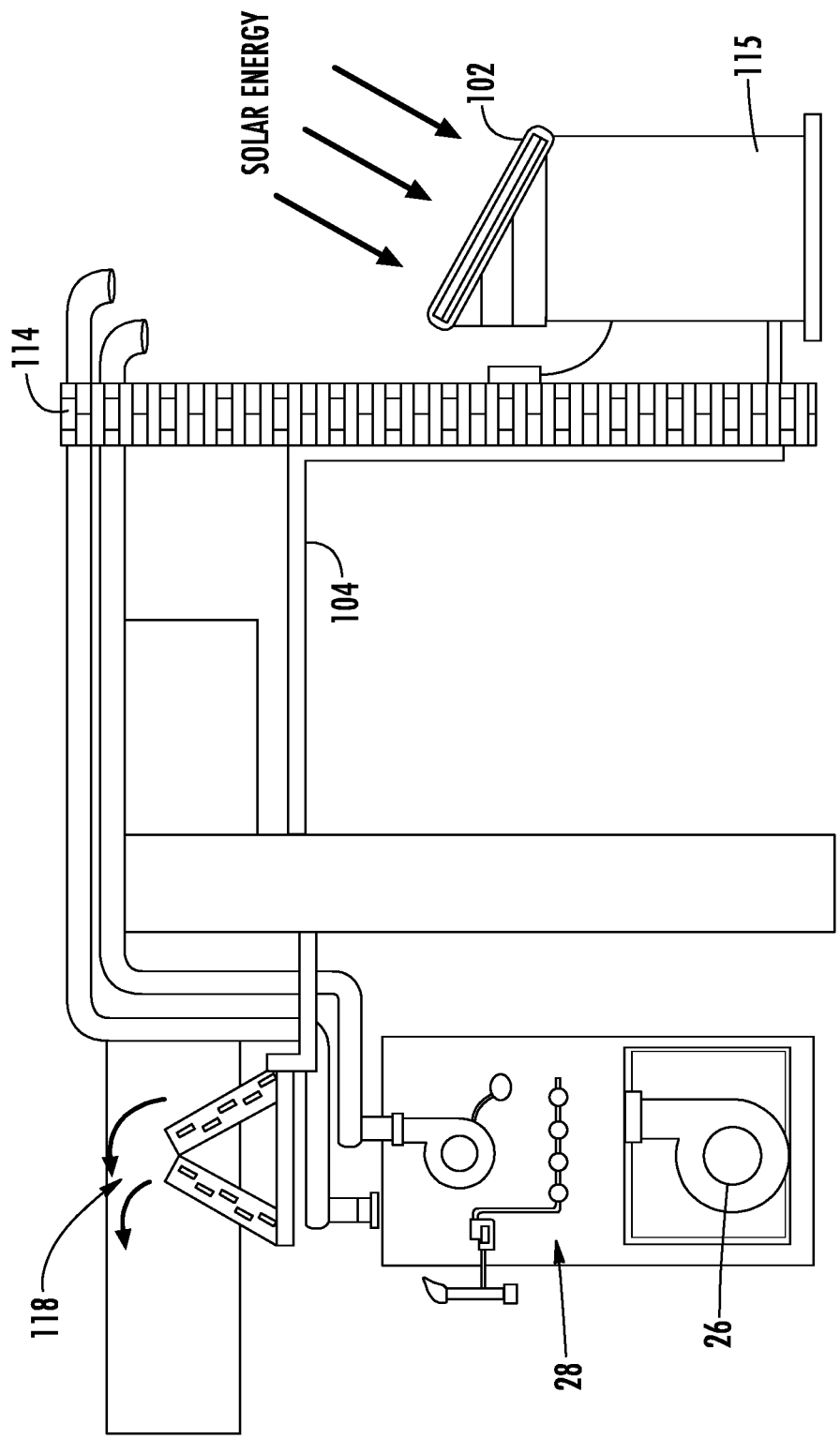

000
THERMAL CELL PANEL SYSTEM FOR HEATING AND COOLING AND ASSOCIATED METHODS

CROSS-REFERENCE TO RELATED APPLICATION

This application is a divisional of U.S. Non-provisional application Ser. No. 16/423,887, filed on May 28, 2019, the contents of which application are hereby incorporated by reference in their entirety.

FIELD OF THE INVENTION

The present invention relates to heating and cooling systems, and more particularly, to a thermal cell panel system for heating and cooling and associated methods

BACKGROUND OF THE INVENTION

Various heating and air conditioning systems have been used in buildings for many years. Typical systems pertain to heating a building utilizing a method of combusting a fossil fuel such as home heating oil, natural gas, propane, coal, wood, etc. and using the thermal energy or heat from that combustion process to heat the building. These systems also include diverting the emissions or flue gas from the combustion process outside the building and into the environment.

In the new carbon aware world we now live in, these types of heating systems are rather primitive and destructive. Not only does burning these fossil fuels release harmful emissions including carbon dioxide, but these heating systems also release thermal waste or heat into the environment. As scientist are well aware, major factors that cause global warming include carbon dioxide acting as a greenhouse blanket in the upper layers of the atmosphere and heat being trapped by this blanket. Burning fossil fuels increases both of these factors in their greatest and most damaging form.

Another type of system for heating and cooling a building involves utilizing a refrigerant to absorb heat from one location and transfer it to another. A compressor moves refrigerant in one state to a device which changes the state and temperature of the refrigerant during a cooling cycle. This type of system allows for the absorption of heat from one location and transfers it to another. For example, heat can be absorbed from an outdoor area and released inside the building during a reverse cycle of this type of system often referred to as the heat pump cycle.

In more detail, refrigerants absorb and move thermal energy or heat from one location to another. The chemical formulation of the refrigerants specific to certain applications allow for a state and/or chemical reaction of the refrigerant to allow these properties. For example, a refrigerant under high pressure will take the form of a liquid, while under low pressure that same refrigerant will take the form of a vapor or gas which has a much lower temperature and the ability to absorb heat. Furthermore, in order for the cooling cycle to continue the refrigerant must be compressed using mechanical energy after an expansion process. Compressing the refrigerant will increase the pressure of the refrigerant in order to repeat the compression and expansion of the cooling cycle.

Solar technology has also been used in heating systems. For example, photovoltaics use thin silicone layers and compounds to convert solar rays into DC electric current. Another type of of solar technology is a solar thermal collector. The solar thermal collector may use pipes running through a panel usually lined with reflective material or dark backgrounds to direct solar rays into the pipes in a method of heating liquids flowing through these pipes. This method is used to heat pools, and water heaters, for example.

However, none of the existing heating and cooling systems that minimize environmental impacts such as current solar technology, do not perform as well as conventional fossil fuel systems or systems powered by fossil fuels. Accordingly, there is a need in the art for an improved heating and cooling system.

SUMMARY OF THE INVENTION

It is an object of the invention to provide a heating and cooling system that is environmentally friendly but performs as well as, or better than, heating and cooling systems that are powered by fossil fuels.

A thermal cell panel system for heating and cooling using a refrigerant is disclosed. The system includes a plurality of solar thermal cell chambers, and a piping network for a flow of the refrigerant through the plurality of solar thermal cell chambers. The piping network includes an inlet and outlet to each solar thermal cell chamber. In addition, the system includes a compressor having a motor coupled to a variable frequency drive ("VFD"), where the compressor is coupled to the piping network upstream of the plurality of solar thermal cell chambers and the VFD is configured to adjust a speed of the motor in response to the pressure of the refrigerant within the plurality of solar thermal cell chambers.

The piping network may include an inlet manifold coupled to the inlet of each solar thermal cell chamber, an outlet manifold coupled to the outlet of each solar thermal cell chamber, and a bypass in fluid communication with the inlet manifold and outlet manifold. The bypass is configured to direct a fluid flow from the inlet manifold to the outlet manifold in order to bypass the plurality of solar thermal cell chambers.

The piping network includes pipes through each of the thermal cell chambers and the pipes have heat sink aluminum sleeves. In addition, the pipes and the heat sink aluminum sleeves may be coated with a thermal absorbing material. Each of the solar thermal cell chambers may be insulated and have an interior surface coated with a reflective material.

The solar thermal cell chambers may have a U-shaped bottom portion to reflect solar energy to the pipes and each of the solar thermal cell chambers may have tempered glass secured over a top portion to retain heat therein. Each of the solar thermal cell chambers may have a plurality of drain holes and the pipes may comprises copper piping.

The system may also include a plurality of pressure valves in fluid communication with each inlet and outlet, where each of the pressure valves is configured to selectively open and close the flow of refrigerant through a respective solar thermal cell chamber in response to a pressure of the refrigerant within the respective solar thermal cell chamber.

The system may include a condenser coil coupled to the piping network downstream of the plurality of solar thermal cell chambers, and an evaporator coil coupled to the piping network downstream of the condenser coil and upstream of the compressor.

In another particular aspect, a solar thermal cell chamber for heating and cooling using a refrigerant is disclosed. The solar thermal cell chamber includes a housing, and piping within the housing for a flow of the refrigerant. The piping has an inlet and outlet to the housing. The solar thermal chamber also includes a heat sink aluminum sleeve over the piping within the housing, and a pressure sensor configured to determine a pressure of the refrigerant within the housing and the pressure sensor is configured to be coupled to a compressor in order to adjust a speed of the compressor in response to the pressure of the refrigerant within the housing.

In yet another particular aspect, a method of operating a thermal cell panel system comprising a plurality of solar thermal cell chambers, a piping network for a flow of a refrigerant through the plurality of solar thermal cell chambers for heating and cooling, and a compressor having a motor coupled to the piping network upstream of the plurality of solar thermal cell chambers, is disclosed. The method includes adjusting a speed of the motor in response to a pressure of the refrigerant within the respective solar thermal cell chamber, and selectively opening and closing a pressure valve in fluid communication with the piping network in order to open and close the flow of refrigerant through the housing in response to the pressure of the refrigerant within the housing.

The method may also include recirculating the refrigerant though the piping network from the condenser through the plurality of solar thermal cell chambers, to a condenser coil coupled to the piping network downstream of the plurality of solar thermal cell chambers, to an evaporator coil coupled to the piping network downstream of the condenser coil, and returning to the condenser.

BRIEF DESCRIPTION OF THE DRAWINGS

FIG. 3B is a schematic of the thermal cell panel system of FIG. 2 having a heat pump.

DETAILED DESCRIPTION OF PREFERRED EMBODIMENTS

Figure 1:
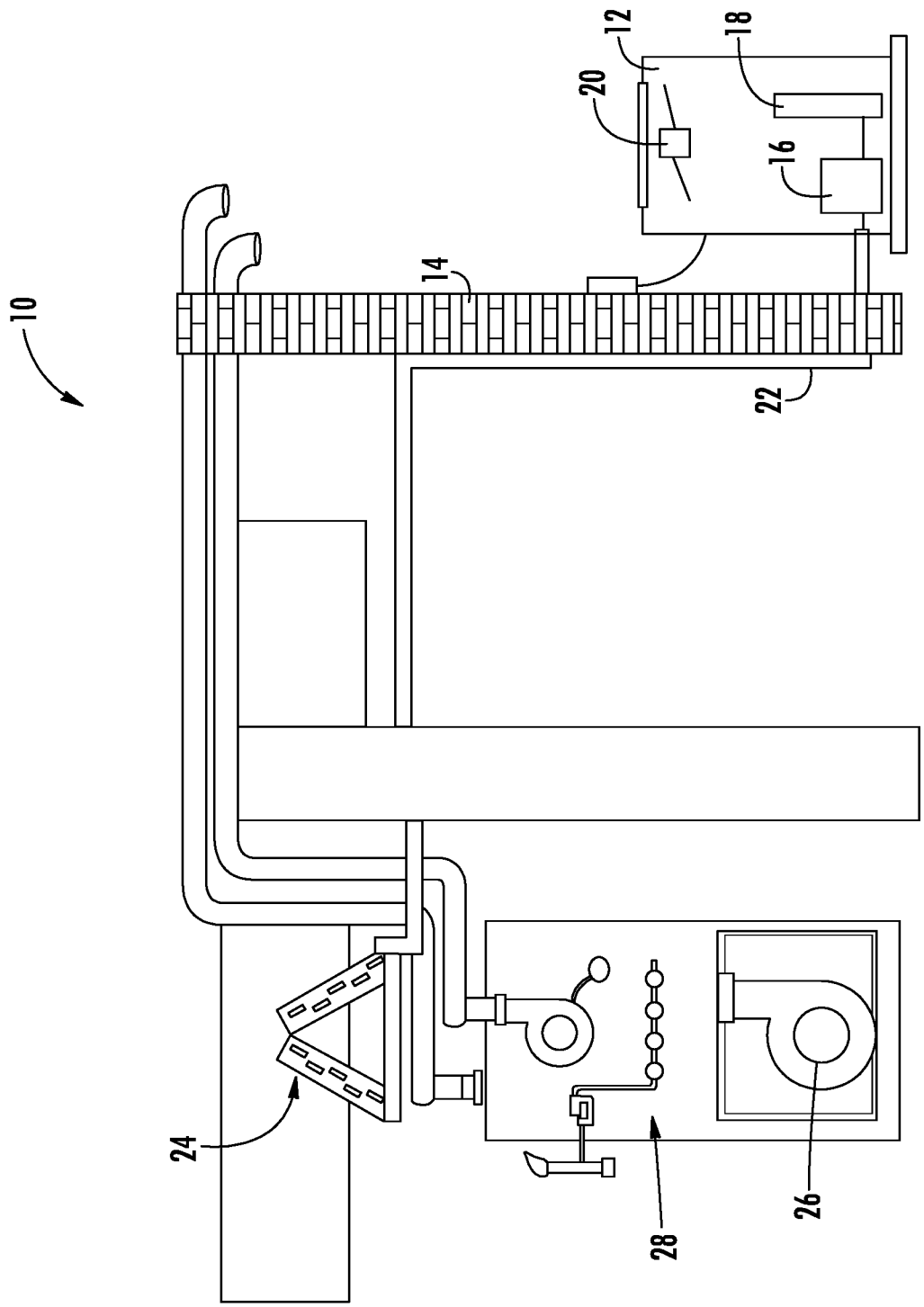
FIG. 1 is a schematic of a typical heating and cooling system.

In the summary of the invention, provided above, and in the descriptions of certain preferred embodiments of the invention, reference is made to particular features of the invention, for example, method steps. It is to be understood that the disclosure of the invention in this specification includes all possible combinations of such particular features, regardless of whether a combination is explicitly described. For instance, where a particular feature is disclosed in the context of a particular aspect or embodiment of the invention, that feature can also be used, to the extent possible, in combination with and/or in the context of other particular aspects and embodiments of the invention, and in the invention generally.

This invention stretches across two well-known industries, the heating and cooling industry and the solar industry. This invention describes new systems and methods of solar thermal reactions with refrigerants in order to dramatically reduce the need of mechanical and electrical energy to move along the refrigeration circuit. Accordingly, this will significantly reduce the electrical energy required for the heating and cooling cycles of a refrigeration circuit or heat pump.

Also, the present systems and methods described herein will reduce the need for fossil fuel combustion as a form of heating a structure. The systems and methods, which utilize sun rays and heat as a sort of fuel to cool a building, overcome the obstacles which cause a building temperature to rise and will instead be used be utilized to cool the building. The warmer and sunnier it is outside, the more efficient the present cooling system will be which is the opposite of the operation of conventional cooling systems.

With respect to heating a building, the present systems and methods use the sun rays and thermal energy in the environment, no matter how cold, to heat a building utilizing a refrigeration cycle or heat pump process. The conventional systems are enhanced by the present improvements described herein which assist the heat pump cycle to heat a building without the need for fossil fuels. This in turn reduces greenhouse gases caused by the combustion of fossil fuels that are used to typically heat a building. Furthermore, the present systems and methods significantly reduce thermal pollution caused by the same combustion processes.

The thermal cell panel system for heating and cooling and associated methods disclosed herein use the sun and environmental thermal energy along with a typical heat pump or air conditioning condensing unit with a variable speed compressor and associated sensors. The system and method detects the outside temperatures, humidity, and weather conditions and interfaces those to the system's internal pressures, temperatures etc., in order to achieve maximum efficiencies. This process resembles artificial environmental intelligence. In addition, the heat pump and the thermal cell panel system are fabricated in one complete and enclosed unit.

Referring now to FIG. 1, a schematic of a typical heating and cooling system is illustrated and designated 10. The system 10 includes a condenser unit 10 positioned outside the building 14. The condenser unit 10 includes a compressor 16, a condenser coil 18, and a fan 20. The compressor 16 comprises a pump that moves refrigerant between an evaporator coil 24 and the condenser coil 18 to chill the indoor air. The condenser coil 18 releases collected heat into the outside air. The fan 20 blows air over the condenser coil 18 to help dissipate the heat outside the building 14. Coolant lines 22 run from the condenser unit 10 to the evaporator coil 24 inside the building 14 and back to the condenser unit 10. A blower 26 is positioned to circulate air over the evaporator coil 24 in order to disperse the chilled air inside the building 14. A typical gas furnace 28 is also illustrated in FIG. 1 that is used for heating the building 14 through the combustion of natural gas and the blower 26 can be used to disperse the heated air inside the building 14.

Figure 2:
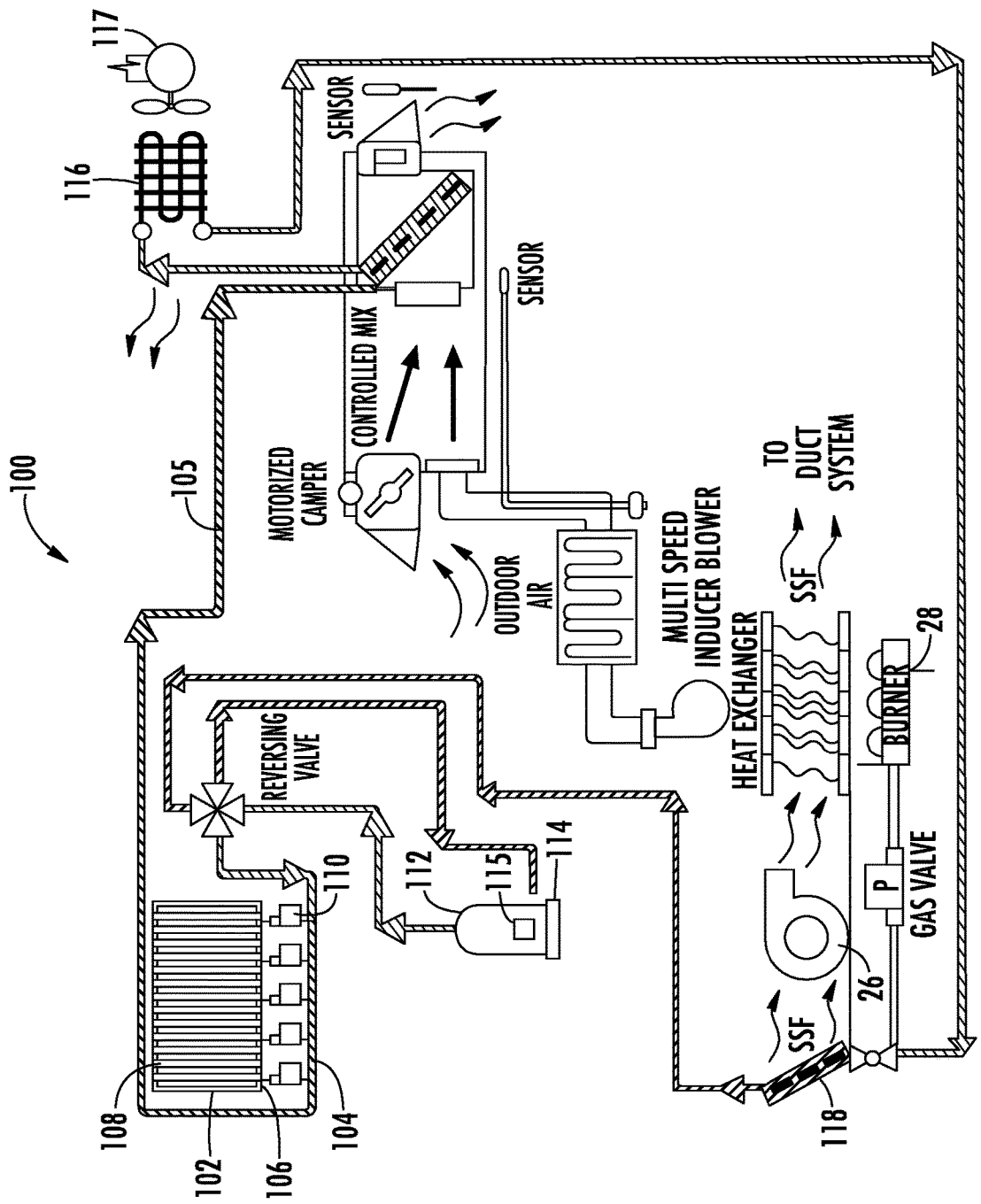
FIG. 2 is a schematic process diagram of a thermal cell panel system for heating and cooling in which various aspects of the disclosure may be implemented.

A schematic of a thermal cell panel system for heating and cooling in accordance with the present invention is illustrated in FIG. 2 and generally designated 100. The system 100 includes a plurality of solar thermal cell chambers 102 and a piping network 104 for a flow of the refrigerant through the plurality of solar thermal cell chambers 102. The piping network 104 includes an inlet 106 and outlet 108 to each of the solar thermal cell chambers 108.

A plurality of pressure valves 110, that are optional and are not required for maximum performance, are in fluid communication with each inlet 106, and each of the pressure valves 110 may be configured to selectively open and close the flow of refrigerant 105 through a respective solar thermal cell chamber 108 in response to a pressure of the refrigerant 105 within the respective solar thermal cell chamber 108.

The system includes a compressor 112 having a motor 114 coupled to a variable frequency drive ("VFD") 115. The compressor 112 is coupled to the piping network 104 upstream of the plurality of solar thermal cell chambers 108 and the VFD 115 is configured to adjust a speed of the motor 114 in response to the pressure of the refrigerant 105 within the plurality of solar thermal cell chambers 108.

The system 100 also includes a condenser coil 116 coupled to the piping network 104 downstream of the plurality of solar thermal cell chambers 108. A fan 117 blows air over the condenser coil 116 to help dissipate the heat of the refrigerant 105. In addition, an evaporator coil 118 is coupled to the piping network 104 downstream of the condenser coil 116 and upstream of the compressor 112.

Figure 3A:
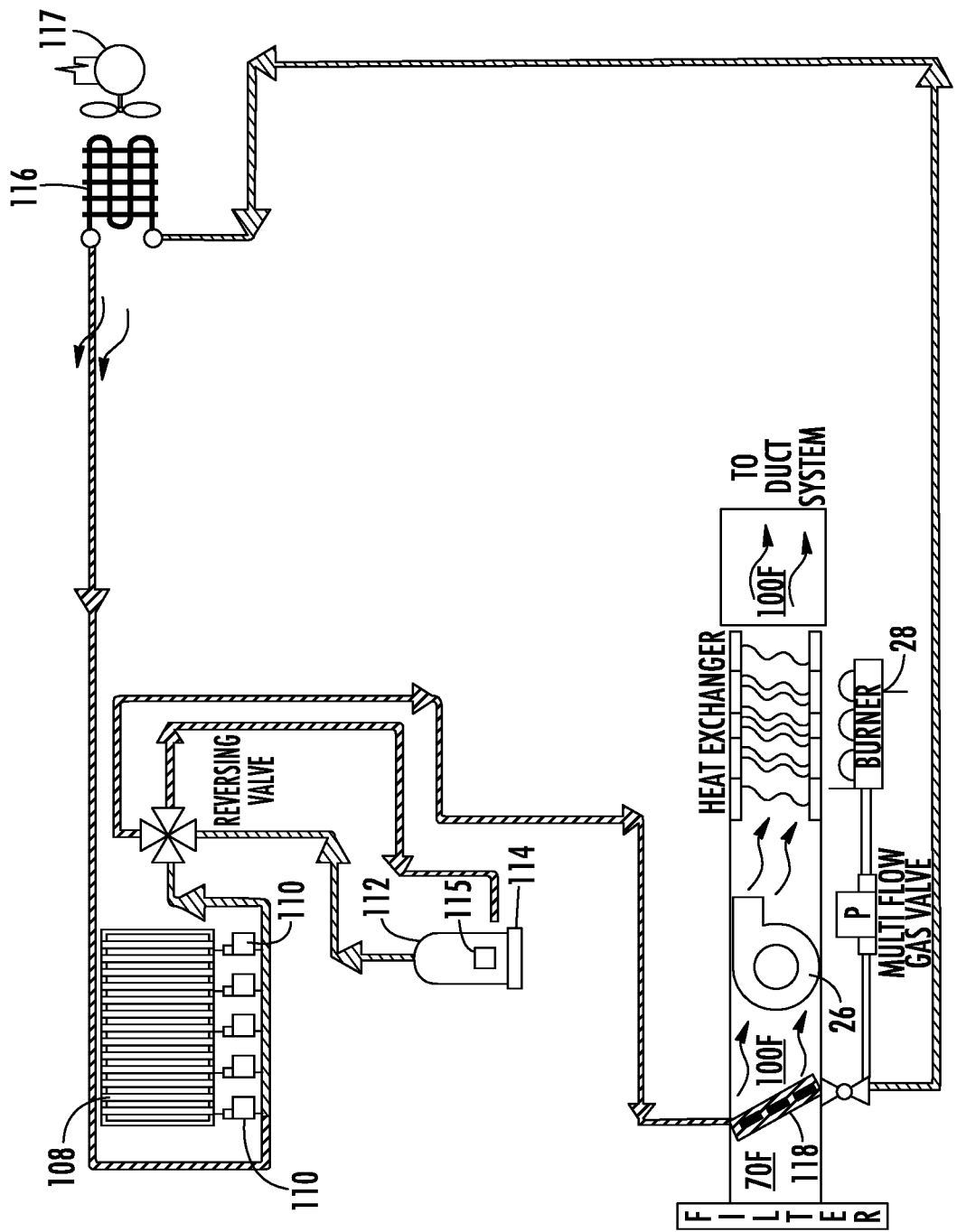
FIG. 3A is a schematic of a heating stage process diagram in which various aspects of the disclosure may be implemented.

Referring now to FIGS. 3A and 3B, a reverse flow of refrigerant 105 through the system 100 is known as the heat pump cycle. The refrigerant 105 is allowed to absorb heat from the cold air and then flow through the pipes 128 of the plurality of solar thermal cell chambers 102. This results in increasing the temperature of the refrigerant 105 even further from external forces allowing a heat pump 115 to absorb heat efficiently during the coldest winter conditions. The system 100 reduces the need to use fossil fuels as a combustion source to heat a structure 114 and releases virtually no thermal pollution or cause greenhouse gas emissions from operation.

Furthermore, the system 100 is dramatically more efficient than any source of combustion and will significantly reduce the cost of heating a building 114. The system 100 is a relatively simple and inexpensive retro fit to a conventional heat pump 115 or air conditioning condensing unit 12. In addition, the system 100 installs virtually identically to a conventional heat pump 115 or condensing unit 12 and works with practically any furnace or air handler. The system 100 reduces the need for the furnace 28 to use combusted fossil fuels but utilizes the blower section 26 of these components making the combustion chambers obsolete.

Figure 4:
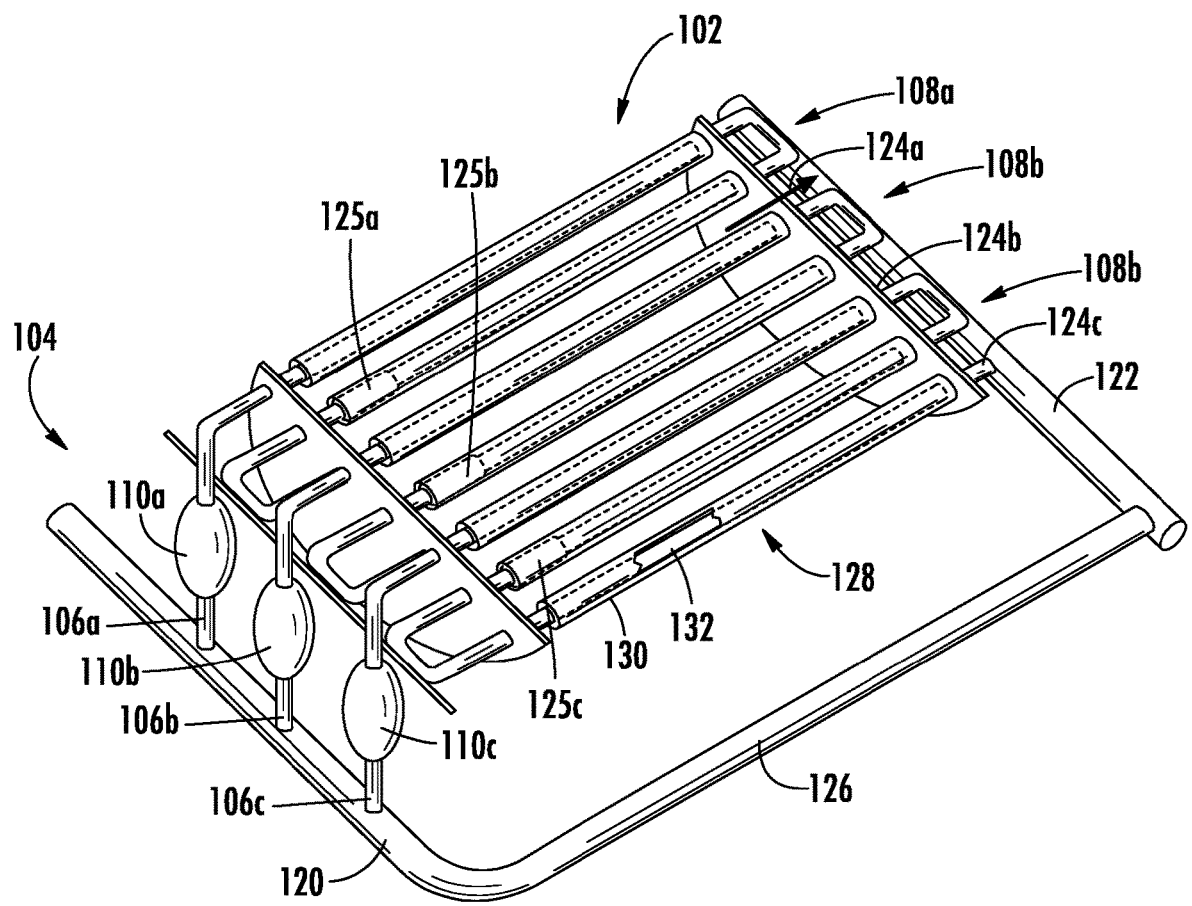
FIG. 4 is a perspective schematic view of a plurality of the solar thermal cell chambers.

Referring now to FIG. 4, the piping network 104 may also include an inlet manifold 120 coupled to the inlet 106a, 106b, 106c of the respective solar thermal cell chamber 108a, 108b, 108c. In addition, an outlet manifold 122 may be coupled to the outlet 124a, 124b, 124c of the respective solar thermal cell chamber 108a, 108b, 108c, and a bypass 126 in fluid communication with the inlet manifold 120 and outlet manifold 122. The bypass 126 is configured to direct a fluid flow from the inlet manifold 120 to the outlet manifold 122 to bypass the plurality of solar thermal cell chambers 108 when the pressure valves 110 are closed. As stated above, the pressure valves 110 are optional and are not required for maximum performance. The solar thermal cell chambers 108a, 108b, 108c, which hold gained thermal energy for extended and prolonged periods of time 12-24 hours in many cases with no direct solar or thermal gain.

The piping network 104 includes pipes 128 through each of the thermal cell chambers 108 and the pipes 128 may have heat sink aluminum sleeves 130. The pipes 128 and the heat sink aluminum sleeves 130 may also be coated with a thermal absorbing material 132. Sensors 125a, 125b, 125c having pressure and/or temperature capabilities are within each solar thermal cell chamber 108a, 108b, 108c, and may be in communication with the respective pressure valve 110a, 110b, 110c. As stated above, the pressure valves 110a, 110b, 110c are optional and are not required for maximum performance. Once the temperature exceeds the corresponding refrigerant pressure, the respective pressure valve 110a, 110b, 110c are opened. In addition, the sensors 125a, 125b, 125c are in communication with the compressor 112 in order to adjust a speed of the motor 114 in response to the pressure of the refrigerant.

Figure 5:
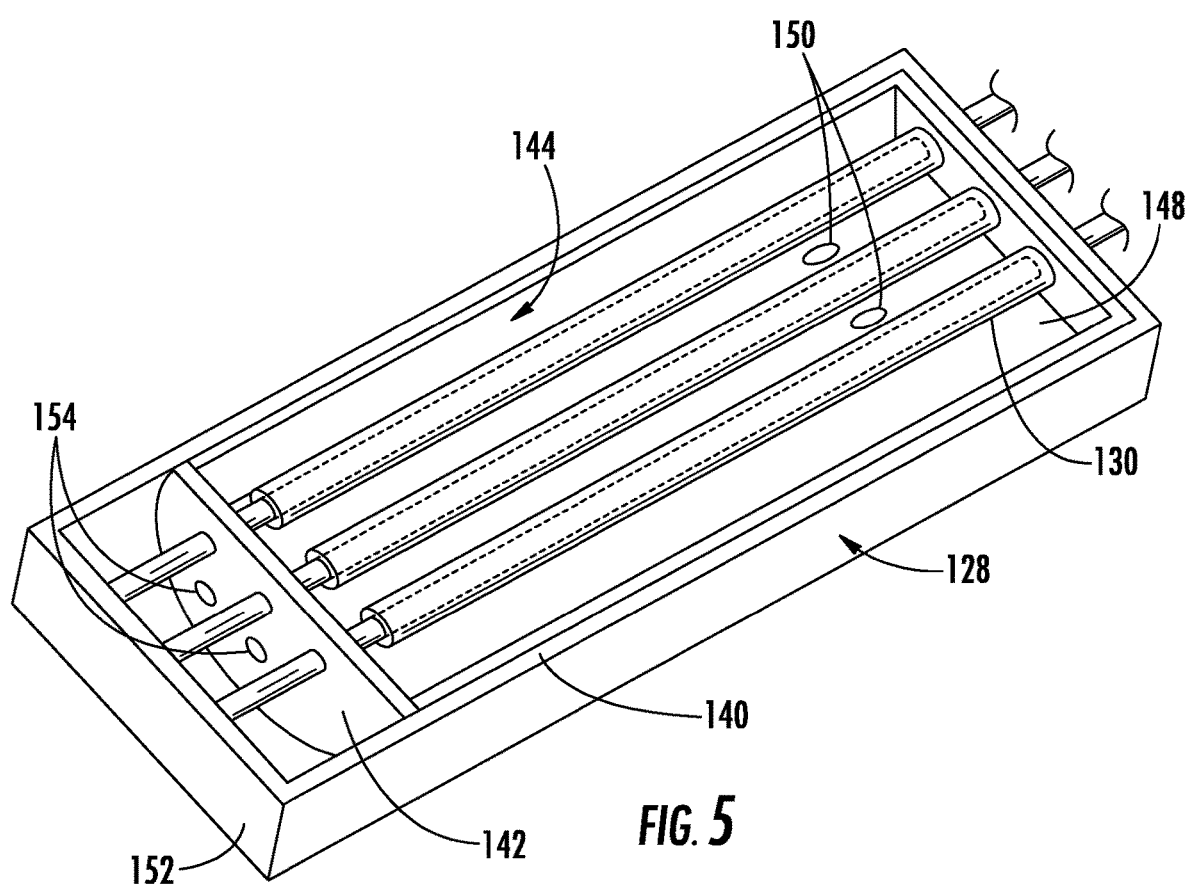
FIG. 5 is a perspective schematic view of the solar thermal cell chamber shown without various components for clarity.

Referring now to FIG. 5, a housing 152 for each of the solar thermal cell chambers 108 is insulated 140 and has an interior surface 144 coated with a reflective material 146. In a particular aspect, the solar thermal cell chambers 108 have a U-shaped bottom portion 142 to reflect solar energy to the pipes 128 and tempered glass 148 secured over a top portion to retain heat with the solar thermal cell chamber 108. The solar thermal cell chambers may also have a plurality of drain holes 150 and the piping 128 may comprises copper piping.

As explained above, the thermal cell chambers 108 include a series of pipes 128 running a circuit through the housings 152 which may be lined with highly reflective material 146, which is many times more reflective mirrored film than any other ever developed. Each pipe 128 running through the thermal cell chambers 108 may be fitted with a heat sink aluminum sleeve 130. The sleeve 130 may be made of any material with high thermal transfer properties.

The heat sink sleeves 130 and pipes 128 may also be coated with a compound or coating 132, which has been specifically developed to absorb many spectrums of solar rays and absorb energy from those rays into thermal energy and into the pipes 128. The U-shaped bottom portion 142 and pipes 128 may be encased in a highly insulated housing 152 to collect and maintain the thermal energy collected. The tempered glass covering 148 may be comprised of carbon filtered ultra, clear glass with little or no light refraction properties. The high temperature double wall insulated housing 152 may also have drain holes 150 and thermal expansion release holes 154. The use of specialized reflective films and coatings applied to the heat sinks and pipes directs all phases and rays of solar activity into thermal heat gain on the specialized coated materials, even in direct sunshine and through clouds in which certain rays are found.

Figure 6:
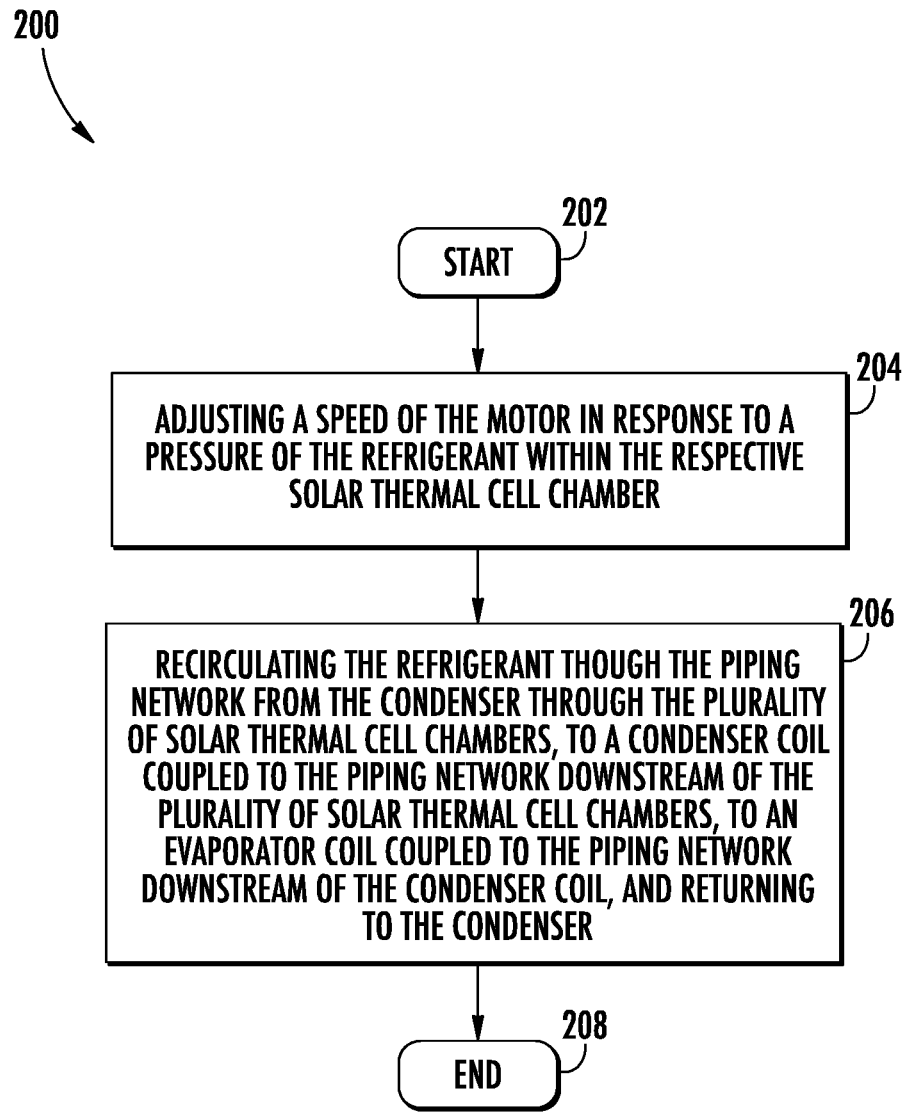
FIG. 6 is a flowchart illustrating a method of operating the thermal cell panel system illustrated in FIG. 1.

Referring now to FIG. 6, a method of operating a thermal cell panel system comprising a plurality of solar thermal cell chambers, a piping network for a flow of a refrigerant through the plurality of solar thermal cell chambers for heating and cooling, and a compressor having a motor coupled to the piping network upstream of the plurality of solar thermal cell chambers, is disclosed. The method is generally designated 200 and begins at 202. The method includes adjusting a speed of the motor, at 204, in response to a pressure of the refrigerant within the respective solar thermal cell chamber.

The method also includes, at 206, recirculating the refrigerant though the piping network from the condenser through the plurality of solar thermal cell chambers, to a condenser coil coupled to the piping network downstream of the plurality of solar thermal cell chambers, to an evaporator coil coupled to the piping network downstream of the condenser coil, and returning to the condenser. The method ends at 208.

As explained above, the refrigerant 105 from the heat pump or condensing coil 116 is diverted from the compressor 112 prior to the condensing coils 116 through the panel and piping circuit described above. The refrigerant 105 flows through the series of pipes 128 and after it is compressed by variable speed compressor 112, the refrigerant 105 flows through the solar thermal cell chamber 108 described above. The warm high pressure refrigerant 105 flows through the hot pipes 128 and the pressure in the refrigerant 105 dramatically rises. The reaction by the gas causes an increase in pressure ahead of the compressor 112 is detected and the compressor 112 can significantly reduce its speed and compression which in turn reduces the electrical use.

The system 100 and method 200 described herein has little or nothing to do with a transfer of heat, which is the key component to conventional solar collection. The present invention describes the warm refrigerant 105 flowing through an even warmer chamber (i.e., the solar thermal cell chamber 108), in order to cause a state change reaction forcing an increase in the pressure of the refrigerant 105 but pulling very little thermal energy away from the heated solar thermal cell chamber 108.

Figure 7:
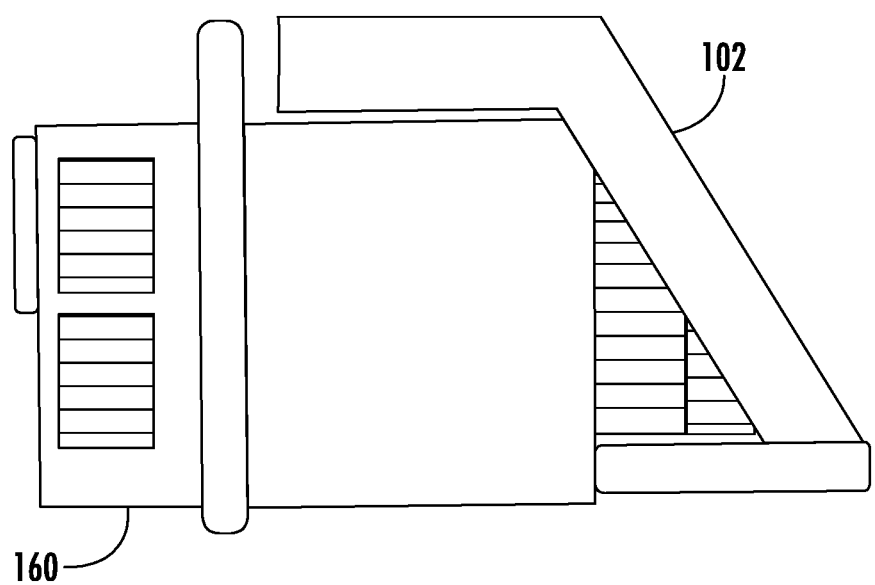
FIG. 7 is an example of a window unit installed with the thermal solar thermal cell panel system.

In addition, the system 100 and method 200 can be applied to many forms of HVAC equipment including but not limited to P-TAC units, window units, roof top units, residential and commercial units, industrial units, etc. For example, a window unit 160 is shown in FIG. 7 with the solar thermal cell chambers 102. Further, the system 100 and method can be used in pool heaters, water heaters, fluid and solid heating systems etc.

Accordingly, this allows the reaction to continue much longer than a conventional solar collection system in which the heat is transferred to a colder liquid in an effort to transfer the collected thermal energy. This new system and method described herein in which there is a pressure increase but little if any thermal transfer lasts much longer than any solar based unit because the heat is stored inside the insulated solar thermal cell chamber 108 allowing for optimal use well after the sun is no longer shining on the system.

Even on cloudy days, certain spectrums of the sun are absorbed to increase the pressure and collect the thermal energy within the solar thermal cell chamber 108. This system 100 can reduce the electrical consumption dramatically when compared to conventional cooling methods. Using this system 100 when it is sunnier and the outdoor conditions are warmer can have even more dramatic savings as the pressure from external forces will be greater. This is specifically when cooling capacity is at its greatest. One of the important factors of the system 100 is being able to exploit the characteristic that the rising pressure of the refrigerant 105 causes little or no absorption of heat. This factor is significant as a refrigeration cycle is an equilibrium of heat absorbed and heat released. In other words, heat cannot be added to a refrigeration cycle or the equilibrium will be altered. The system 100 operates on using thermal energy for a pressure increase and not thermal transfer.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:

1. A method of operating a thermal cell panel system comprising a plurality of solar thermal cell chambers comprising a series of pipes and a bottom portion with a U-shape lined with a reflective material configured to direct solar light onto the series of pipes, a piping network comprising heat sink aluminum sleeves disposed thereon and coated with a thermal absorbent material, for a flow of a refrigerant through the plurality of solar thermal cell chambers for heating and cooling, and a compressor having a motor coupled to the piping network upstream of the plurality of solar thermal cell chambers, the method comprising:
   adjusting a speed of the motor in response to a pressure of the refrigerant within the respective solar thermal cell chamber; and
   recirculating the refrigerant through the piping network from a compressor through the plurality of solar thermal cell chambers, to a condenser coil coupled to the piping network downstream of the plurality of solar thermal cell chambers, to an evaporator coil coupled to the piping network downstream of the condenser coil, and returning to the compressor.

2. A method of operating a thermal cell panel system comprising a plurality of solar thermal cell chambers comprising a series of pipes, a piping network, for a flow of a refrigerant through the plurality of solar thermal cell chambers for heating and cooling, and a compressor having a motor coupled to the piping network upstream of the plurality of solar thermal cell chambers, the piping network comprising an inlet manifold coupled to the inlet of each solar thermal cell chamber, an outlet manifold coupled to the outlet of each solar thermal cell chamber, and a bypass in fluid communication with the inlet manifold and outlet manifold, the bypass configured to direct a fluid flow from the inlet manifold to the outlet manifold to bypass the plurality of solar thermal cell chambers, the method comprising:
   adjusting a speed of the motor in response to a pressure of the refrigerant within the respective solar thermal cell chamber; and
   recirculating the refrigerant through the piping network from a compressor through the plurality of solar thermal cell chambers, to a condenser coil coupled to the piping network downstream of the plurality of solar thermal cell chambers, to an evaporator coil coupled to the piping network downstream of the condenser coil, and returning to the compressor.

3. The method of claim 1, wherein each of the solar thermal cell chambers includes tempered glass secured over a top portion.

4. The method of claim 1, further comprising selectively opening and closing the flow of refrigerant through the plurality of solar thermal cell chambers in response to the pressure of the refrigerant.

5. The method of claim 2, wherein each of the solar thermal cell chambers includes tempered glass secured over a top portion.

6. The method of claim 3, further comprising selectively opening and closing the flow of refrigerant through the plurality of solar thermal cell chambers in response to the pressure of the refrigerant.

* * * * *